United States Patent [19]

Burnett et al.

[11] Patent Number: 4,668,038
[45] Date of Patent: May 26, 1987

[54] SAFETY GRADE PRESSURIZER HEATER POWER SUPPLY CONNECTOR ASSEMBLY

[75] Inventors: James M. Burnett; Rohit M. Daftari; Randolph M. Reyns, all of Lynchburg, Va.

[73] Assignee: The Babcock & Wilcox Company, New Orleans, La.

[21] Appl. No.: 782,154

[22] Filed: Oct. 1, 1985

Related U.S. Application Data

[63] Continuation of Ser. No. 500,477, Jun. 2, 1983, abandoned.

[51] Int. Cl.$^4$ .............................................. H01R 4/00
[52] U.S. Cl. ..................................... 339/94 M; 174/76
[58] Field of Search .................. 339/147 R, 117, 94, 339/275 R, 275 B, 136 R, 136 M, 92 R, 92 M; 174/76, 91, 93

[56] References Cited

U.S. PATENT DOCUMENTS

| 2,247,671 | 7/1941 | Zepel | 174/76 |
| 3,188,382 | 6/1965 | Fuss | 174/91 |
| 3,378,811 | 4/1968 | Cullen et al. | 339/117 R |
| 3,633,155 | 1/1972 | Taylor | 339/117 R |

FOREIGN PATENT DOCUMENTS 0997149 2/1983 U.S.S.R. .................. 339/117 R

Primary Examiner—Eugene F. Desmond
Assistant Examiner—David Pirlot
Attorney, Agent, or Firm—Robert J. Edwards; Mark B. Quatt

[57] ABSTRACT

An integral safety-grade pressurizer heater power supply connector assembly which can withstand severe environmental conditions such as a loss of coolant accident and main steam-line break while providing uninterrupted power to a pressurizer heater in a pressurized water nuclear reactor system.

4 Claims, 6 Drawing Figures

4,668,038

SAFETY GRADE PRESSURIZER HEATER POWER SUPPLY CONNECTOR ASSEMBLY

This application is a continuation of application Ser. No. 06/500,477 filed June 2, 1983 now abandoned.

BACKGROUND

This invention relates to a power supply connector assembly for the heater of a pressurized water nuclear reactor pressurizer.

In a typical pressurized water nuclear reactor, a nuclear core of fissionable material is cooled by primary coolant which during operation flows past the core and picks up heat therefrom. This reactor coolant is under a considerable pressure during operation such that the heated water remains in a subcooled state.

This pressure is maintained within certain limits by means of a pressurizer, essentially an external upright pressure vessel equipped with a spray nozzle and electric heaters.

The pressurizer contains water and steam. To increase primary coolant pressure, for example during heat losses, reactor startup, and load changes causing a pressure drop, the electric heaters heat the water within the pressurizer, thereby creating more steam and displacing water to a surge line connected to the primary coolant system.

The electric heaters used to increase steam pressure are typically found within the lower section of the pressurizer. These heaters are of the direct-immersion type, sheathed in stainless steel or Inconel, and shop assembled in bundles. Each of the two or three bundles is field installed through penetrations in the vessel wall, and sealed by means of a gasketed closure. An electrical connection is then made to the end of each heater using a special fitting which provides insulation from the steam and water.

The use of special connectors or cable assemblies to provide electrical power to the pressurizer heaters in a nuclear steam generating electrical supply system is well known in the art. However, in the past, these connectors with attached power supply cabling have not been designed as an integral unit capable of operating during and after a severe environmental transient, for example a loss-of-coolant accident (LOCA) or a main steam-line break (MSLB).

Instead, these connectors have commonly been comprised of simply a standard, pin-socket type connector tied to a braided cable. As a result, there have been several incidents where pressurizer heaters were rendered temporarily inoperative due to severe adverse environmental effects. These unanticipated periods of inoperability are extremely undesirable as they may hamper control and operation of the pressurizer, and thereby the primary coolant system.

It is therefore desirable, as a solution to this recurrent problem, to design an integrated pressurizer heater power supply connector which would have the ability to resist extreme environmental conditions.

SUMMARY OF THE INVENTION

The problems associated with the prior art are solved to a substantial extent through the practice of this invention. A pressurizer heater power supply connector assembly comprises a pin-socket type connector, flexible sealed conduit, internal high temperature cable, and a shop splice assembly which attaches the connector assembly to power cabling in an area where the adverse environmental conditions have been substantially moderated.

Thus, a power supply connector assembly according to the present invention is able to withstand extreme environmental conditions.

BRIEF DESCRIPTION OF THE DRAWINGS

In the accompanying drawings, forming a part of this specification, and in which reference numerals shown in the drawings designate like or corresponding parts throughout the same.

DETAILED DESCRIPTION OF THE PREFERRED EMBODIMENT

Figure 1:
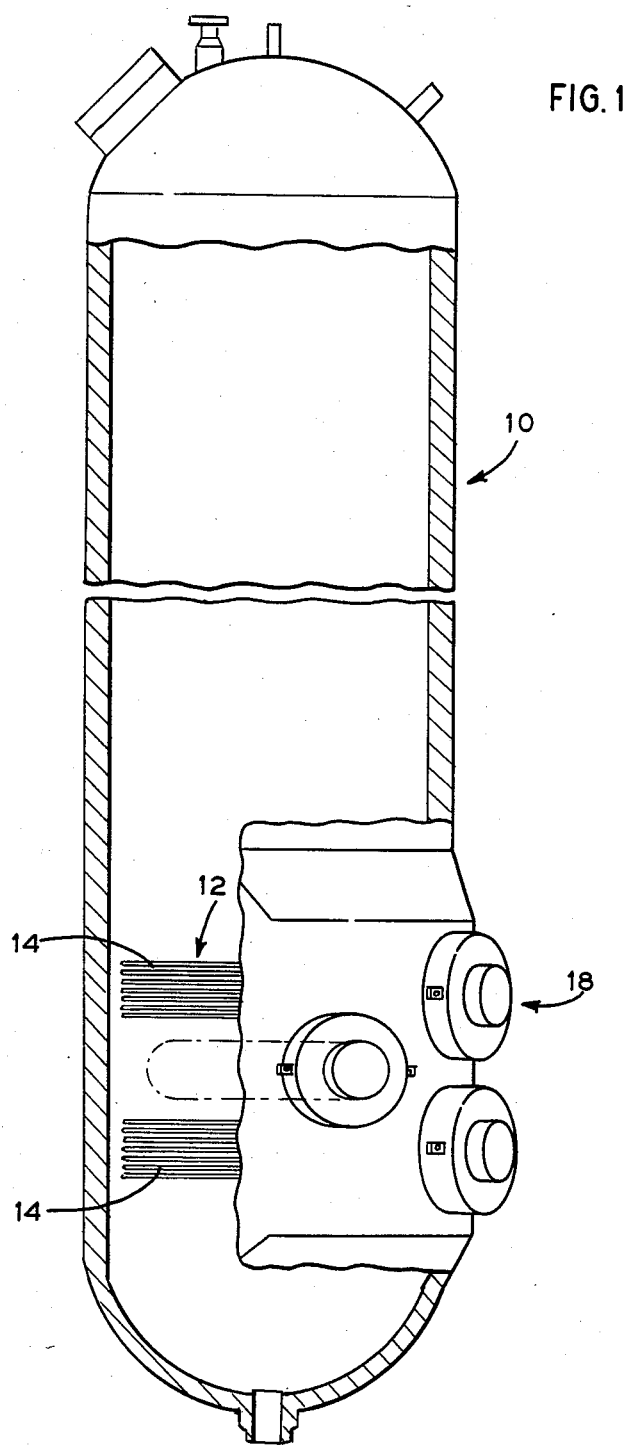
FIG. 1 is a side view, partially schematic and partially in perspective, of a pressurized water reactor pressurizer with electric heater bundles in the lower section thereof.

Referring to FIG. 1, a pressurized water reactor pressurizer 10 has an electric heater bundle 12 located in the lower section thereof. Typically two or three such electric heater bundles 12 will be present. Each electric heater bundle 12 includes a group of electric heater elements 14.

Figure 2:
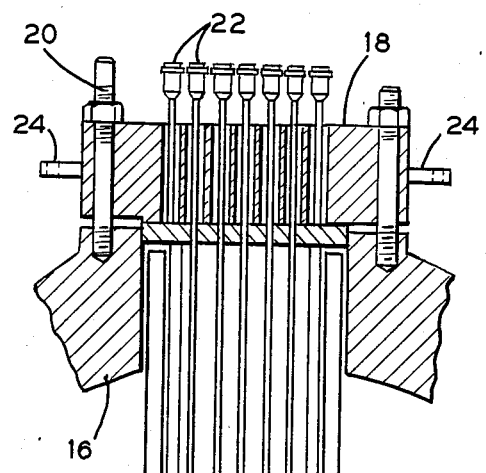
FIG. 2 is a cross-sectional view of an electric heater bundle located within the pressurizer, with integral heater receptacles located outside the wall of the pressurizer.
Figure 3:
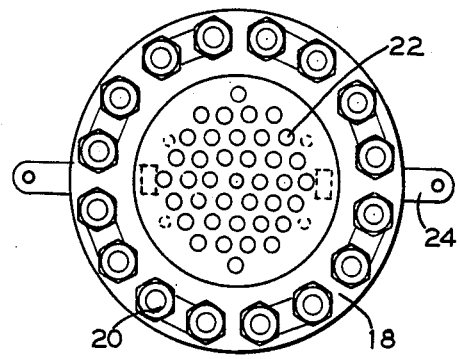
FIG. 3 is a side view of a heater bundle viewed from outside the pressurizer.

Each electric heater bundle 12 is oriented in a horizontal plane within the lower portion of the pressurizer 10. The extremities of each electric heater element 14 of an electric heater bundle 12 project through a cover plate 18. Studs 20 hold the cover plate 18 to the wall 16 of the pressurizer. These features are best seen in FIG. 2. The portion of each electric heater element 14 projecting beyond, i.e., outside the cover plate 18, ends in an integral heater receptacle 22. FIG. 3 shows an end view of an electric heater bundle 12 including the cover plate 18, lifting lugs 24, a plurality of studs 20 arranged along the circumference of cover plate 18, and a plurality of integral heater receptacles 22 arranged within the central portion of cover plate 18.

Figure 4:
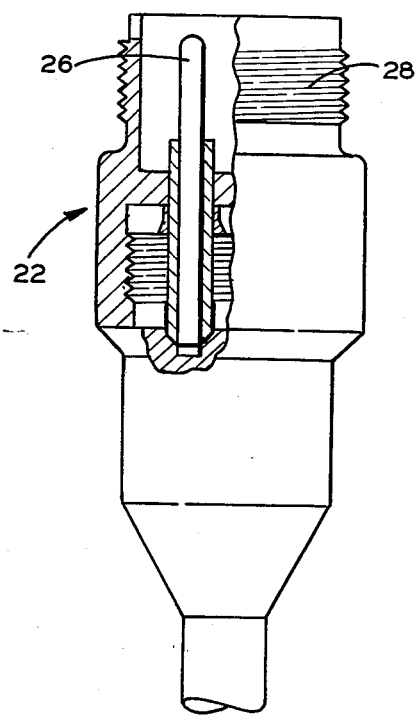
FIG. 4 is a detailed side view, partly in section, of an integral heater receptacle.

FIG. 4 shows an integral heater receptacle 22. A pair of pins 26 interconnects with corresponding contact sockets 44 (see FIG. 5) of the safety grade pressurizer heater power supply connector assembly. Threaded element 28 interconnects with coupling nut 36 (see Fig. 5) of the safety grade pressurizer heater power supply connector assembly.

The pressurizer heater, electric heater bundles with electric heater elements 14, cover plate 18 and related hardware, and integral heater receptacle 22 are essentially standardized parts with minor modifications.

Figure 5:
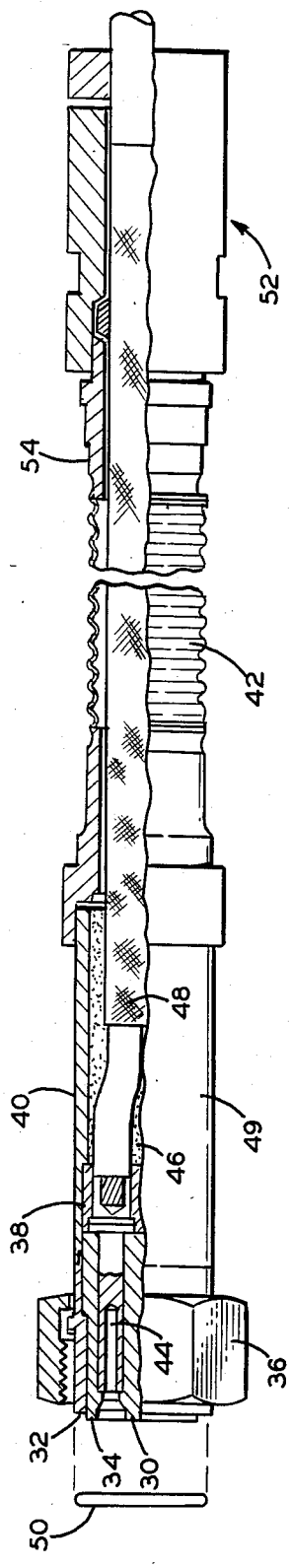
FIG. 5 is a safety grade pressurizer heater supply connector assembly in accordance with the present invention.

FIG. 5 shows a safety grade pressurizer heater power supply connector assembly in accordance with the present invention. A pin-socket type connector 30, as indicated above, connects to a pair of pins 26 of integral heater receptacle 22 best shown in FIG. 4. A connector assembly also includes a tubular body with a shell 32 and a back shell 40. The shell 32 surrounds an insert 34. This insert is preferably made of a ceramic material. As also indicated above, coupling nut 36 connects to threaded element 28 of the integral heater receptable 22. The connector assembly also includes a rear insert 38 and a back shell 40 encompassing an internal braided cable 48. This internal cable is typically a high temperature glass braid cable, and a potting compound 46 fills the interstices between the cable 48 and the back shell 40. A hose adapter 49 circumferentially surrounds the internal braided cable 48, potting compound 46, back shell 40, and rear insert 38. The end of the connector assembly closest to the pressurizer wall, as just described, is also with some modifications a standard part well known in the art.

A flexible corrugated hose 42 surrounds the central portion of internal braided cable 48, typically for a distance of about 9 feet although greater or lesser lengths of cable 48 and corresponding lengths of flexible corrugated hose 42 may be employed.

A gasket 50 is typically used to ensure a sealing relationship between the pin-socket type connector 30 of the safety grade pressurizer heater power supply connector assembly and each integral heater receptacle 22 of electric heater element 14 of electric heater bundle 12.

Figure 6:
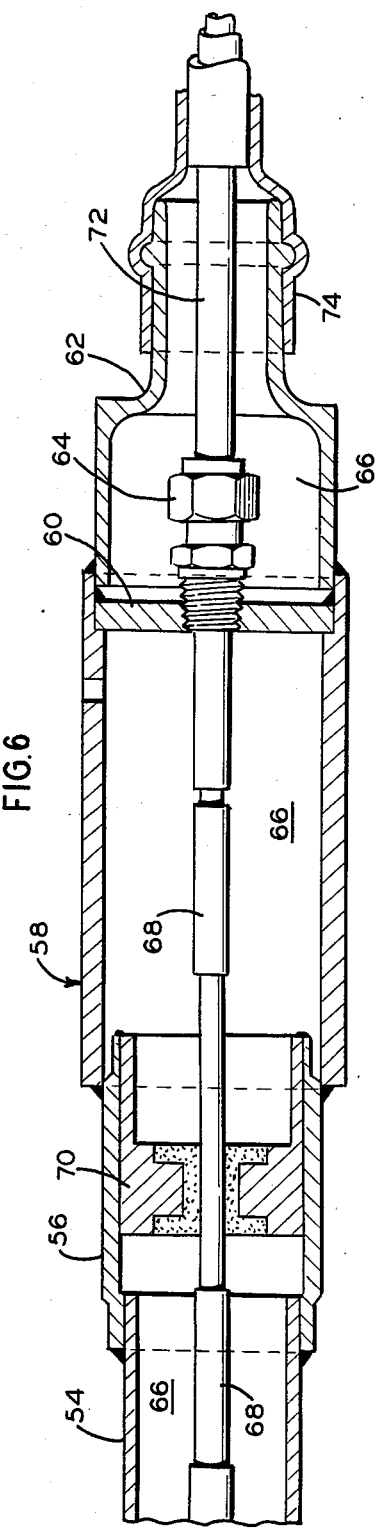
FIG. 6 is a detailed sectional view, longitudinally, of a shop splice assembly in accordance with the present invention.

A shop splice assembly 52 ties the internal braided cable, already described, to an external power source. Fig. 6 shows details of the shop splice assembly 52 including a cable clamp 54, header adapter 56, transition sleeve 58, and potting boot 62. Cable clamp 54 is welded to header adapter 56, which is in turn welded to transition sleeve 58. Cable clamp 54 acts as a pressure seal. Transition sleeve 58 in turn overlaps and is welded to potting boot 62. A plate 60 is welded to and bounded by a radially interior edge of transition sleeve 58 as well as one end of potting boot 62. A standard penetration device 64 is housed within potting boot 62. Butt splices 68 connect internal braided cable 48 on one side of a standard header assembly 70. A power cable 72 leading to a power source extends from butt splice 68 on the opposite side of standard header assembly 70 through the standard penetration device 64 within a flexible sleeve 74. The volumetric space between butt splices 68 and cable clamp 54 and transition sleeve 58 respectively are filled with potting 66 to ensure resistance to shock and vibration, and to provide additional dialectric material. Potting 66 is also present in the space between standard penetration device 64 and potting boot 62.

Practice of this invention provides extremely good resistance to mechanical damage to what would otherwise be fully exposed electrical power cable.

This apparatus also provides resistance to the detrimental effects of fire since all materials used are noncombustible and maintain structural integrity at high temperatures. During accident simulations, full size units withstood a temperature range of about 40° to about 500° F., and a temperature increase of about 380° F. (from a starting temperature of 120° F. to a final temperature of 500° F.) in less than 10 seconds coincident with pressures of up to 80 psig.

The electrical components are mechanically separated by a non-conductive mechanical protective boundary from other non-protected electrical components. Ampacity is rated up to 52.6 amps at rated 460 VAC, 60 Hz, single phase.

This apparatus has shown resistance to a chemical spray of Hydrazine ($N_2H_4$) and boric acid with a spray rate of 0.25 gallons per minute per square foot. It is also resistant to seismic forces of up to six g's horizontal, two g's vertical (simultaneously applied); and to water, steam, and substantial doses of both gamma and beta radiation.

Thus, this connector assembly provides an improved method of supplying uninterrupted electrical power for the operation of pressurizer heaters in a pressurized water reactor system during and after the occurrence of an event which produces an extreme environment in the connector area.

While in accordance with the provisions of the statutes, there is illustrated and described herein a specific embodiment of the invention, those skilled in the art will understand that changes may be made in the form of the invention covered by the claims and that certain features of the invention may be used to advantage without the corresponding use of the other features.

We claim:

1. A pressurizer heater power supply connector assembly for attaching a power cable to an electric heater within a pressurizer of a pressurized water nuclear reactor system, the electric heater having pin contacts, comprising;

a pin-socket type connector including a tubular body having a first open end carrying a pin-socket contact member and an insert intermediate a shell and the pin-socket contact member, the contact member having socket means for electrically receiving and contacting the pin contacts, and a second open end;

a flexible sealed conduit including a flexible corrugated tube having one end connected to the second open end of the pin-socket type connector, and another end;

a shop splice assembly including a header adapter and a hose clamp interconnected between the header adapter and the said another end of the flexible corrugated tube, the header adapter including a tubular sleeve having a bore extending between opposite open adapter ends and a header adapter assembly mounted across the bore intermediate the open adapter ends; a transition sleeve connected to the header adapter opposite the corrugated tube, a potting boot connected to the transition sleeve at an end opposite the header adapter, and a plate mounted to the transition sleeve; and potting filled within the bore, the transition sleeve, and the potting boot;

an internal high temperature cable having a first portion electrically connected to the pin-socket contact member and extending through the tubular body, the flexible corrugated tube and the shop splice assembly adjacent one side of the header adapter assembly and a second portion extended within the opposite side of the header adapter assembly; and the shop splice assembly further comprising butt splice means for electrically connecting the internal high temperature cable to the power cable across the header adapter assembly in an area where adverse environmental conditions are substantially moderated to provide a connector assembly resistant to shock, vibration, fire, external pressure, chemical spray, water, steam and nuclear radiation.

2. The connector assembly according to claim 1 wherein said transition sleeve overlaps and is connected to said header adapter.

3. The connector assembly according to claim 1 wherein said potting boot is overlapped by and connected to said transition sleeve.

4. The connector assembly according to claim 1 wherein said plate is bounded by a radially interior edge of said transition sleeve and by one end of said potting boot.

* * * * *